United States Patent
Stellwag et al.

(10) Patent No.: US 8,178,816 B2
(45) Date of Patent: May 15, 2012

(54) POWER SUPPLY FOR RESISTANCE WELDING UNITS

(75) Inventors: Dieter Stellwag, Erbach (DE); Thomas Klinger, Breuberg (DE)

(73) Assignee: Bosch Rexroth AG, Stuttgart (DE)

( * ) Notice: Subject to any disclaimer, the term of this patent is extended or adjusted under 35 U.S.C. 154(b) by 925 days.

(21) Appl. No.: 11/289,229

(22) Filed: Nov. 28, 2005

(65) Prior Publication Data

US 2006/0138095 A1    Jun. 29, 2006

(30) Foreign Application Priority Data

Dec. 4, 2004    (DE) .......................... 10 2004 058 614

(51) Int. Cl.
*B23K 11/02* (2006.01)
*B23K 11/00* (2006.01)

(52) U.S. Cl. ........................................ 219/108; 219/115

(58) Field of Classification Search .................. 219/108, 219/111, 115, 116; 307/82; 901/42
See application file for complete search history.

(56) References Cited

U.S. PATENT DOCUMENTS

| | | | | |
|---|---|---|---|---|
| 4,376,913 A | * | 3/1983 | Higby | 318/85 |
| 5,072,090 A | * | 12/1991 | Morita | 219/108 |
| 6,004,019 A | * | 12/1999 | Suita et al. | 700/212 |
| 2002/0019877 A1 | | 2/2002 | Wrede | |
| 2002/0035429 A1 | | 3/2002 | Banas | |
| 2002/0134763 A1 | | 9/2002 | Marek et al. | |
| 2005/0061777 A1 | * | 3/2005 | Goetz et al. | 219/108 |

FOREIGN PATENT DOCUMENTS

| | | |
|---|---|---|
| DE | 100 01 130 | 7/2000 |
| DE | 101 14 323 | 9/2002 |
| DE | 101 31 395 | 1/2003 |
| EP | 1 128 265 | 8/2001 |
| EP | 1 324 197 | 7/2003 |

* cited by examiner

*Primary Examiner* — Sang Paik
(74) *Attorney, Agent, or Firm* — Kenyon & Kenyon LLP

(57) ABSTRACT

A device for resistance welding includes a welding clamp housing, a welding transformer, a welding clamp, a welding clamp drive for operating the welding clamp and a power supply using alternating supply voltage. The device may be built as small as possible and may be simple to expand. The power supply is implemented by a main converter and by drive and welding converters. The output of the main converter is connected to the inputs of the drive and welding converters. The inputs of the drive and welding converters are connected to one another. These connections are implemented by an a.c. voltage intermediate circuit.

23 Claims, 5 Drawing Sheets

POWER SUPPLY FOR RESISTANCE WELDING UNITS

CROSS-REFERENCE TO RELATED APPLICATIONS

The present application claims priority to Application No. 10 2004 058 614.4, filed in the Federal Republic of Germany on Dec. 4, 2004, which is expressly incorporated herein in its entirety by reference thereto.

FIELD OF THE INVENTION

The present invention relates to a power supply for resistance welding units.

BACKGROUND INFORMATION

The hierarchical structure of a device for resistance welding is described in German Published Patent Application No. 101 14 323 (see, e.g., FIG. 3). With the aid of a rectified, three-phase a.c. power supply, a.c. voltages of variable phase and frequency are generated for the power supply of the welding clamp and the drives. For this purpose, the welding inverter provides a two-phase output voltage and the drive inverter a three-phase output voltage.

The foregoing is believed to be practical for supplying components within a single unit, but not for bridging greater distances and for supplying several autonomous resistance welding systems, e.g., welding robots within a production line in the automotive industry. Moreover, a new inversion using a relatively complex circuit configuration may be required for generating the welding current. This may entail a greater space requirement.

SUMMARY

An example embodiment of the present invention may provide for the implementation of resistance welding devices that may be as small as possible and that may allow for a simple expansion depending on the particular application.

The power supply of a device mentioned at the beginning may be implemented by a main converter and at least one auxiliary converter, and all converters may be connected to one another, this connection being implemented by an a.c. voltage intermediate circuit.

In other words, a central main converter supplies several auxiliary converters with power via an a.c. intermediate circuit at usually constant frequency. The space required for accommodating the power supply is thus locally separately allocated. As a result, individual components of the device may be built smaller than usual.

There is also the possibility of organizing the auxiliary converters in a decentralized manner and of organizing the main converter in a centralized manner since the converters may also be connected to one another over greater distances (up to, e.g., approximately 100 meters). This means that the auxiliary converters may be arranged in the immediate vicinity of the loads connected to them—such as, for example, a welding clamp or a motor of the welding clamp drive. This may increase the degree of freedom in system design, may allow for a modular concept offering a greater possibility for integration and may simplify the expandability of a resistance welding unit. If the above-mentioned production line had to be expanded, this may be done in a simple manner merely by connecting further auxiliary converters to the main converter via the a.c. voltage intermediate circuit. The main converter then also supplies the newly added resistance welding device with power. The connecting system (a.c. voltage intermediate circuit) between main converter and auxiliary converters may be implemented using a star topology since all inputs of the auxiliary converters are connected to the output of the main converter. Consequently, all inputs of the auxiliary converters are also automatically connected with one another.

One auxiliary converter may be assigned as a drive converter to an electrical drive, for example, a welding clamp drive, and one auxiliary converter may be assigned as a welding converter to a welding clamp. The application of the principle hereof is also provided for resistance welding units that operate with the aid of a pneumatic/hydraulic welding clamp drive. In that instance, the auxiliary converters merely represent welding converters and no drive converters. Mixed forms, that is, resistance welding units operated on the a.c. voltage intermediate circuit having pneumatic/hydraulic and/or electric welding clamp drives may be implemented as well. Thus, in comparison to conventional systems, the inversion of the current obtained from a primary d.c. voltage intermediate circuit internal to the device may be substantially eliminated since a welding transformer or a welding converter may be supplied directly with the a.c. voltage stemming from the a.c. voltage intermediate circuit. The task of the drive converter—unless the drive is alternatively pneumatic/hydraulic—is to ensure a power supply for a connected servomotor which operates the welding clamps.

The main converter and the drive converter mainly convert their input voltages or input currents with respect to phase and/or frequency, while the decentralized welding converter first and foremost controls the load power. This allows for a flexible creation of the required boundary conditions (number of welding clamps, etc.) for implementing an application process depending on the particular application and the system components used. Thus, for example, a two-phase a.c. voltage intermediate circuit may be used for power distribution, while the actual supply circuit is arranged as a three-phase system. The drive converter normally supplies a variable output frequency at a fixed phase number so as to be able to vary the speed of the connected servomotor. The frequency of the output voltage of the main converter, by contrast, is normally constant, as are the number of phases.

The load power control of a welding converter may be implemented with the aid of a phase-angle control. This phase-angle control may be implemented at relatively low expenditure with the aid of antiparallel connected thyristors (or a triac), is thus cost-effective and may require little room for accommodation. This may also reduce the size. Alternatively, an implementation may also occur in a conventional manner using IGBTs in H bridge circuit.

The welding clamp housing and/or the welding transformer housing may include the decentralized drive and/or welding converter and/or a welding control. The main converter produces the supply voltage for several welding clamps which house the drive and/or welding converters either within their housing and/or within the welding transformer housing which is contained in the welding clamp housing. For this purpose, the main converter is arranged in a central location, for example, within a manufacturing plant, while the drive and/or welding converters are placed in a decentralized manner in the immediate vicinity of the welding devices. In the instance where the welding converter is integrated in the welding transformer housing, one obtains a partially integrated power supply which is used for the primary side supply of a transformer and which possibly in combination with a rectifier supplies the welding current. Thus, the combination of a water-cooled transformer with/or without rectifier together with the welding converter may form a compact, autonomous unit, which may be used in other applications as well or may also be transferable to other technologies.

A welding clamp drive may include several drives, each drive including a separate drive converter or the welding clamp drive including several drives, each drive including a separate drive converter, the drive converters, however, using a common d.c. voltage intermediate circuit. In the latter instance, unit volume may be reduced because considerably less buffer capacity in the form of capacitors may be required.

The total power to be generated by the main converter for the loads connected to the drive and/or welding converter may be monitored in the central main converter and/or in the welding control If the welding control is arranged in a decentralized manner (e.g., on the welding clamp or in the robot control), the monitoring of the total power occurs in the main converter itself. It may also be possible, however, to integrate a central welding control for controlling several welding clamps connected to the central main converter directly into the main converter. In this instance, it may make sense to have the total power be monitored by the welding control since the latter may supply the required computing capacity and logical analysis without significant additional effort. The integration of the welding control into the main converter is not considered essential, however, because the control may also be accommodated completely independently of the main converter.

Particularly suited for such monitoring is a total power limit control, the loads being managed for the operation in accordance with an management instruction such that the requested power of all loads connected to the main converter in total practically does not exceed the permissible total power or peak load, which the main converter is able to supply.

In monitoring the total power, it may be provided to register only the power supplied by the load power control (welding current controller) to the welding transformer since it represents the major part of the requested power (e.g., approximately 90%) and the power requested by the drives is negligible in comparison. The power consumed by the welding clamp is also requested only briefly for a duration of, e.g., approximately 100 to 300 ms, while the clamp drives are in operation longer or constantly and represent a fixed basic load.

One may use transformers of the same power output throughout such that a maximally possible power N may be estimated per welding station and that the total power of all simultaneously active welding station may be calculated in a simple manner. If the main converter is arranged for a power output of 5×N, for example, and 10 welding clamps having a total power consumption of a maximum of 10×N, for example, are in use, then the monitoring logic is to prevent more than 5 load power controls from becoming active at the same time and requesting power.

A total power monitoring system is used to ascertain how much power is already required or how many loads are already simultaneously active and whether an additional power consumption by additional consumers is still possible. If this is the case, the logic releases the start for the current time for applying welding current to the welding clamp or another consumer. If not, the start will be delayed until another component signals current time termination.

It is also possible to specify the instantaneous power for producing a single welding spot as a criterion for implementing the monitoring of the total power. In this instance, then it may not be a matter of estimating globally the theoretical maximum power consumption of a welding clamp for managing the total power, but rather the welding converter signals to the main converter the welding current required for the imminent welding process separately for each welding process. The total power monitoring system subsequently ascertains whether or not it is possible to release the requested power based on the current capacity utilization. The current times are released either in the order of the requests or by awarding priority. This may result in a simple but effective total power limit control in combination with the power supply for resistance welding systems.

Consequently, especially when using a multitude of welding converters whose total power may be distinctly higher than the maximum power that may be supplied by the main converter, the current time of the welding clamps required for welding processes is influenced in a controlled manner with the aid of a release logic or release control.

The main converter may include interference suppressors for preventing harmonic waves. In this manner, suppression may occur in a centralized manner, thus eliminating interference suppressors for each individual auxiliary converter. Accordingly, at most only a single interference suppressor may be required. This measure may save unit volume and costs. The interference suppressors, for example, may be implemented with the aid of inductors and/or resistors.

A robot may include a resistance welding device hereof. The resistance welding device includes all components required for a welding task such as welding converter, drive converter, etc. The resistance welding device thus forms a functionally self-contained unit, which additionally has at most a power supply terminal and a control terminal, offering certain advantages in terms of a low unit volume and reduced weight. Welding robots organized in a decentralized manner thus may have to handle less weight, which may reduce the mechanical inertia of the robot arm and may provide numerous other positive effects on robot operations.

According to an example embodiment of the present invention, a resistance welding device includes: a power supply including a main converter and at least one auxiliary converter, all of the converters connected with one another via an a.c. voltage intermediate circuit.

A first one of the auxiliary converters may be arranged as a drive converter to an electrical drive, and a second one of the auxiliary converters may be arranged as a welding converter to a welding clamp.

The main converter and the drive converter may be adapted to convert an input voltage with respect to at least one of (a) phase and (b) frequency, and the welding converter may be arranged as a load power control.

The load power control may be arranged as a phase-angle control.

At least one of (a) a welding clamp housing and (b) a welding transformer housing may include at least one of (a) drive converters, (b) welding converters and (c) a welding control.

A welding clamp drive may include at least two electrical drives, and each electrical drive may include a separate drive converter. The welding clamp drive may include at least two electrical drives, each electrical drive may include a separate drive converter, and the drive converters may use a common d.c. voltage intermediate circuit.

At least one of (a) the main converter and (b) a welding control may be adapted to monitor a total power to be generated by the main converter for loads connected to at least one of (a) the drive converter and (b) the welding converter.

A total power limit control may be adapted to perform the monitoring, and loads may be managed for operation in accordance with a management instructions such that a requested power of all loads connected to the main converter does not exceed a permitted peak load.

The main converter may include a device adapted to influence harmonic waves.

The device may include a device adapted to at least one of (a) pneumatically operate and (b) hydraulically operate the welding clamp.

According to an example embodiment of the present invention, a robot includes a resistance welding device as described above.

LIST OF REFERENCE CHARACTERS

1 Main converter
2 Drive converter
3 Welding converter
4 Welding transformer with rectifier
5 A.C. voltage intermediate circuit
6 Welding clamp motors
7 Welding clamp
8 Resistance welding devices
9 Resistance welding system with modular power supply
10 Welding clamp housing
11 Welding transformer housing
12 Welding control
13 Total power limit control
14 Device adapted to influence harmonic waves
15 Welding clamp drive
16 D.C. voltage intermediate circuit Example embodiments of the present invention are described in more detail below with reference to the appended Figures.

DETAILED DESCRIPTION

Figure 1:
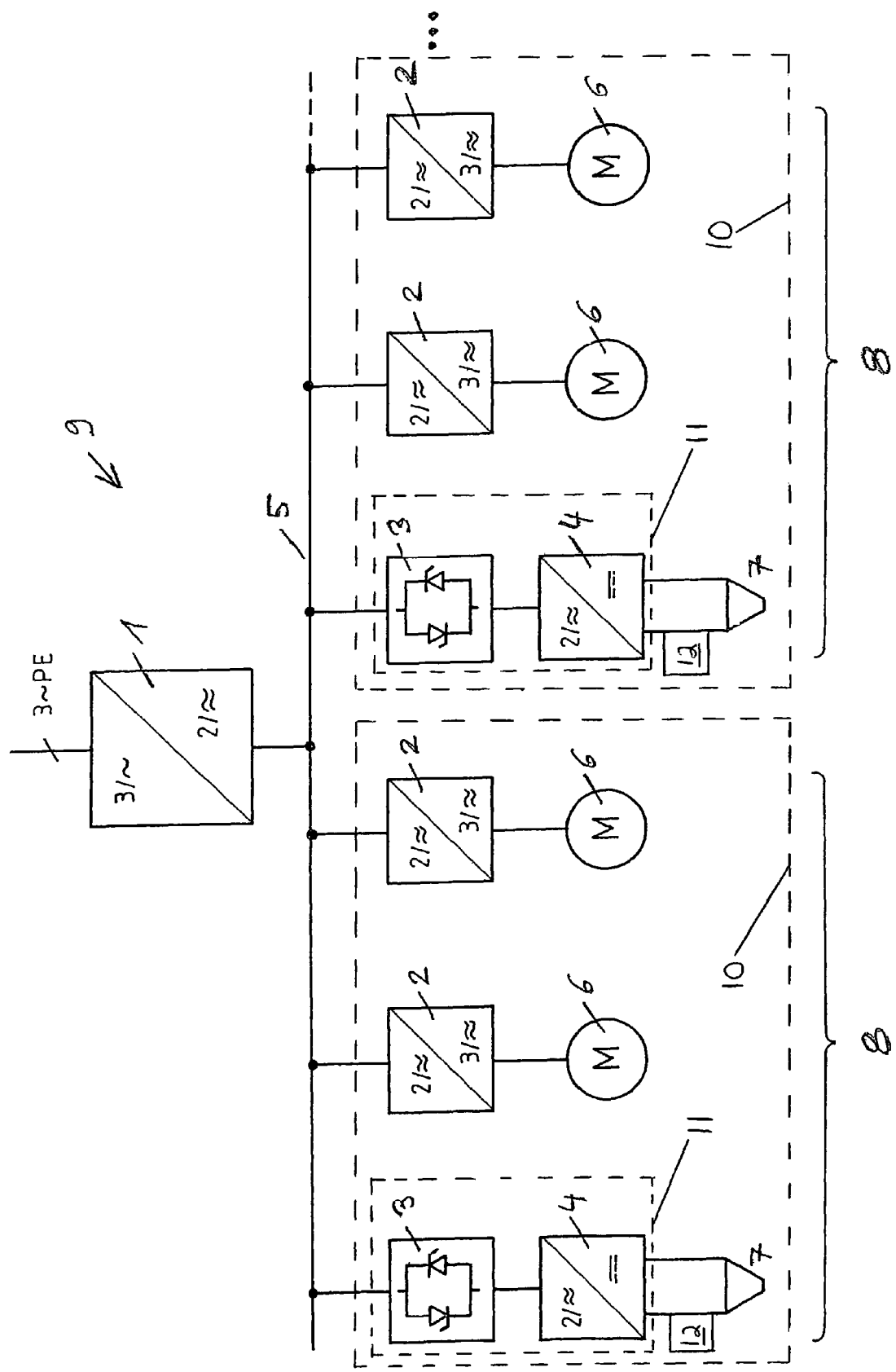
FIG. 1 is a schematic view of an example embodiment of the present invention.

FIG. 1 illustrates a main converter 1, a drive converter 2, a welding converter 3, welding converters with rectifier 4, an a.c. voltage intermediate circuit 5, welding clamp motors 6, welding clamps 7, two resistance welding devices 8 formed by components 3, 4, 7, 2, 6 or an all-comprehensive resistance welding system having a modular power supply 9. Each resistance welding device 8 normally also includes its own welding control 12 installed in a decentralized manner. A welding clamp housing 10 may enclose drive converter(s) 2, welding converter 3, welding transformer with rectifier 4, welding clamp 7 and welding clamp motors 6. A welding transformer housing 11 may enclose the welding converter 3 and the welding transformer with rectifier 4.

Main converter 1 works with a three-phase a.c. voltage having a system frequency at its input of 50/60 Hz (Germany/U.S.A.). It converts this three-phase a.c. voltage into a two-phase a.c. voltage having an intermediate circuit system frequency of, e.g., about 1 kHz. This intermediate circuit system frequency of about, e.g., 1 kHz, however, is merely exemplary. Usually, the intermediate circuit system frequency at the output of main converter 1, however, will be between, e.g., 1 kHz and 10 kHz and thus may be clearly higher than the system frequency at the input of the main converter. Since the output of main converter 1 is connected to a.c. voltage intermediate circuit 5, the use of a two-phase a.c. voltage intermediate circuit 5 having an a.c. voltage frequency of 1 kHz lends itself for this purpose.

Drive converters 2, the inputs of which are connected to a.c. voltage intermediate circuit 5, convert the two-phase a.c. voltage having an intermediate circuit system frequency of 1 kHz into a three-phase a.c. voltage having a variable frequency. This three-phase a.c. voltage having a variable frequency is available at the output of drive converter 2 for supplying servomotor 6. With the aid of this variable frequency, the speed of the motor may be changed.

Welding converter 3, arranged as an a.c. power controller, works with the aid of two antiparallel connected thyristors for phase-angle control as is conventional in resistance welding technology in the application of alternating current (principle of a light dimmer as a power controller) for regulating the welding current. The input of welding converter 3 is connected with a.c. voltage intermediate circuit 5. The output of welding converter 3 supplies a two-phase alternating current unchanged in its phase, which allows for a controllable power supply to welding clamp 7 according to the phase-angle control in welding converter 3. Before the welding current is fed into welding clamp 7, however, it may be provided to perform a rectification with the aid of the welding transformer/rectifier combination 4. Welding converter 3 lends itself to being directly integrated into welding transformer/rectifier combination 4 such that component 3 is also contained in component 4.

Theoretically, an arbitrary number of welding devices 8 may be operated on a.c. voltage intermediate circuit 5. A.C. voltage intermediate circuit 5 additionally may allow for greater distances to be bridged such that even welding devices 8 more or less distant from each other may be operated by one main converter 1. In practice, a limiting factor is, among other things, the maximum admissible system load or the maximum power that main converter 1 is able to supply. If therefore several welding devices 8 are to be operated on one main converter 1, then this main converter may be configured to be suitably powerful and may possibly be equipped with a total load limit control.

Components 3, 4, 2, 6 and 7 of a resistance welding device 8 may be integrated completely or partially into the welding clamp housing 10 such that a part of the required power supply 1, 5, 3, 2, constructed in a modular and flexible manner, may be placed directly at the location of the load. In addition, welding converter 3 may be integrated into welding transformer housing 11.

Figure 5:
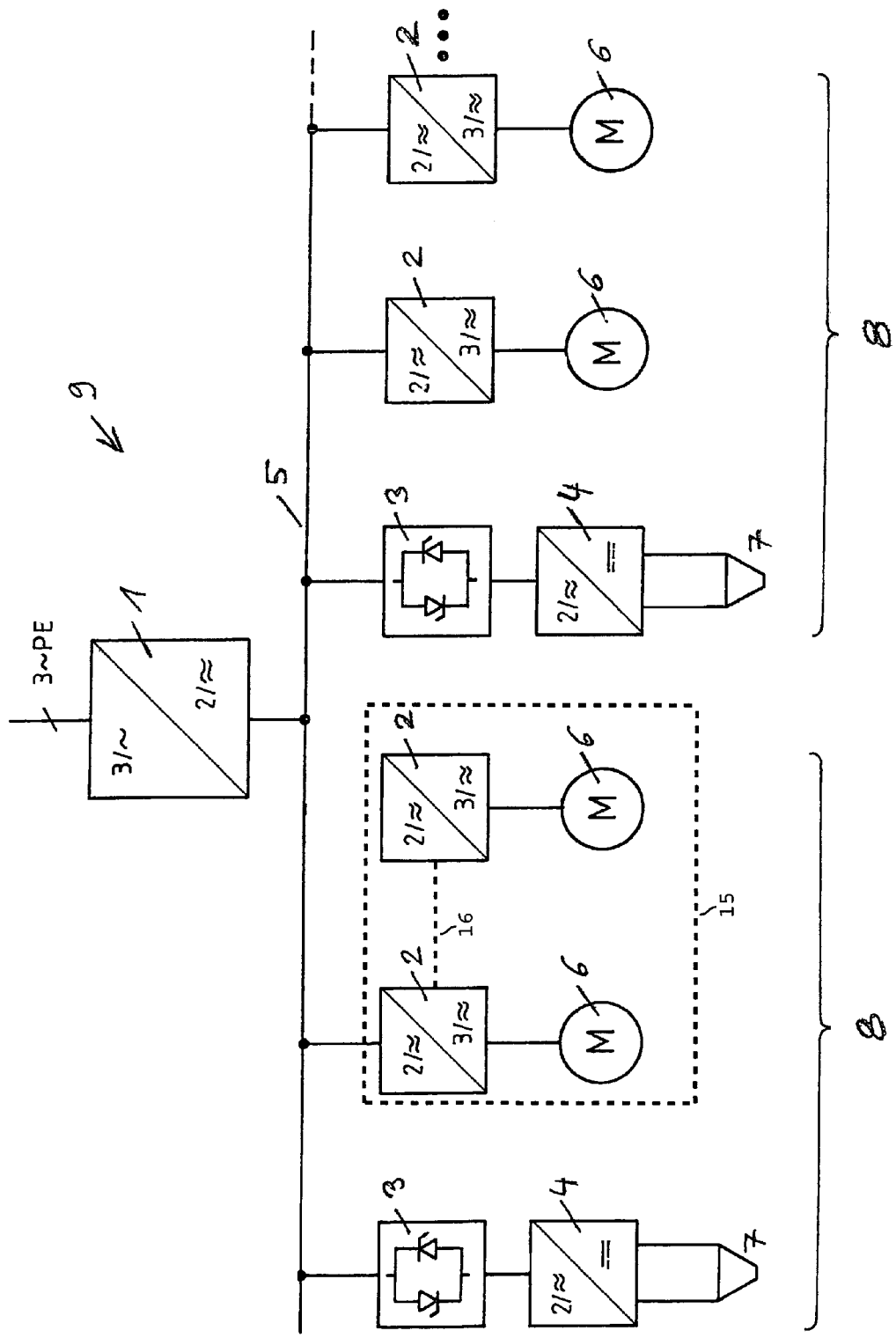
FIG. 5 is a schematic view of an example embodiment of the present invention.

The embodiment of the resistance welding system shown in FIG. 5 is similar to that of FIG. 1, except that a welding clamp drive 15 includes drive converters 2, which may use a common d.c. voltage intermediate circuit 16 for clamp-servomotors 6 such that for both motors 6 only one tap may be required on a.c. voltage intermediate circuit 5, a d.c. voltage stabilized by a buffer capacity being produced from the two-phase a.c. voltage of a.c. voltage intermediate circuit 5, and this d.c. voltage being converted for each motor 6 into a separate three-phase a.c. voltage of variable frequency. In this manner, one may save the space and material for a redundant d.c. voltage intermediate circuit that may otherwise be required.

Figure 2:
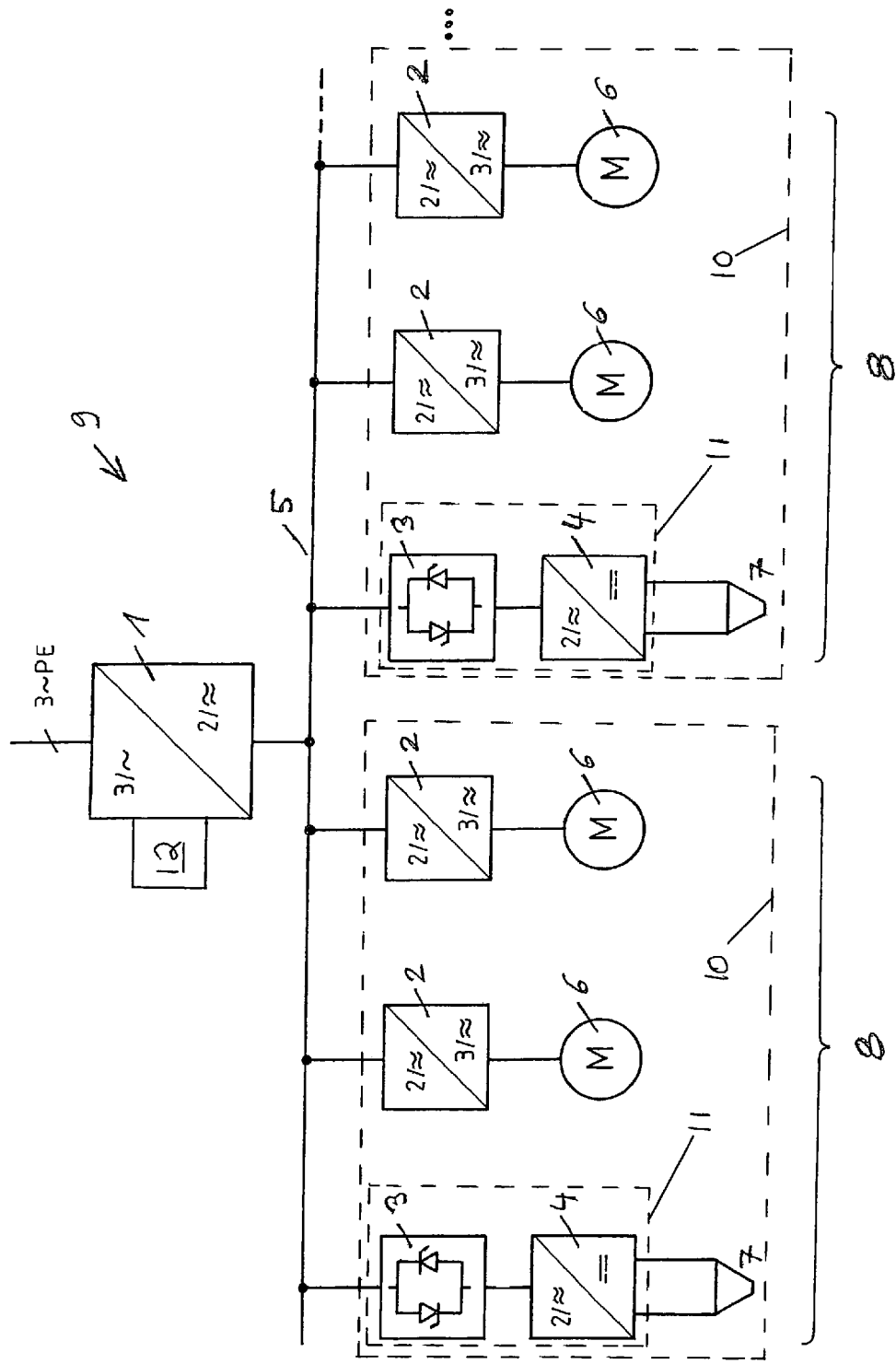
FIG. 2 is a schematic view of an example embodiment of the present invention.

The embodiment of the resistance welding system with modular power supply 9 shown in FIG. 2 is similar to that of FIG. 1, except that the welding control 12 is not situated at the welding clamp 7 but integrated into the main converter 1.

Figure 3:
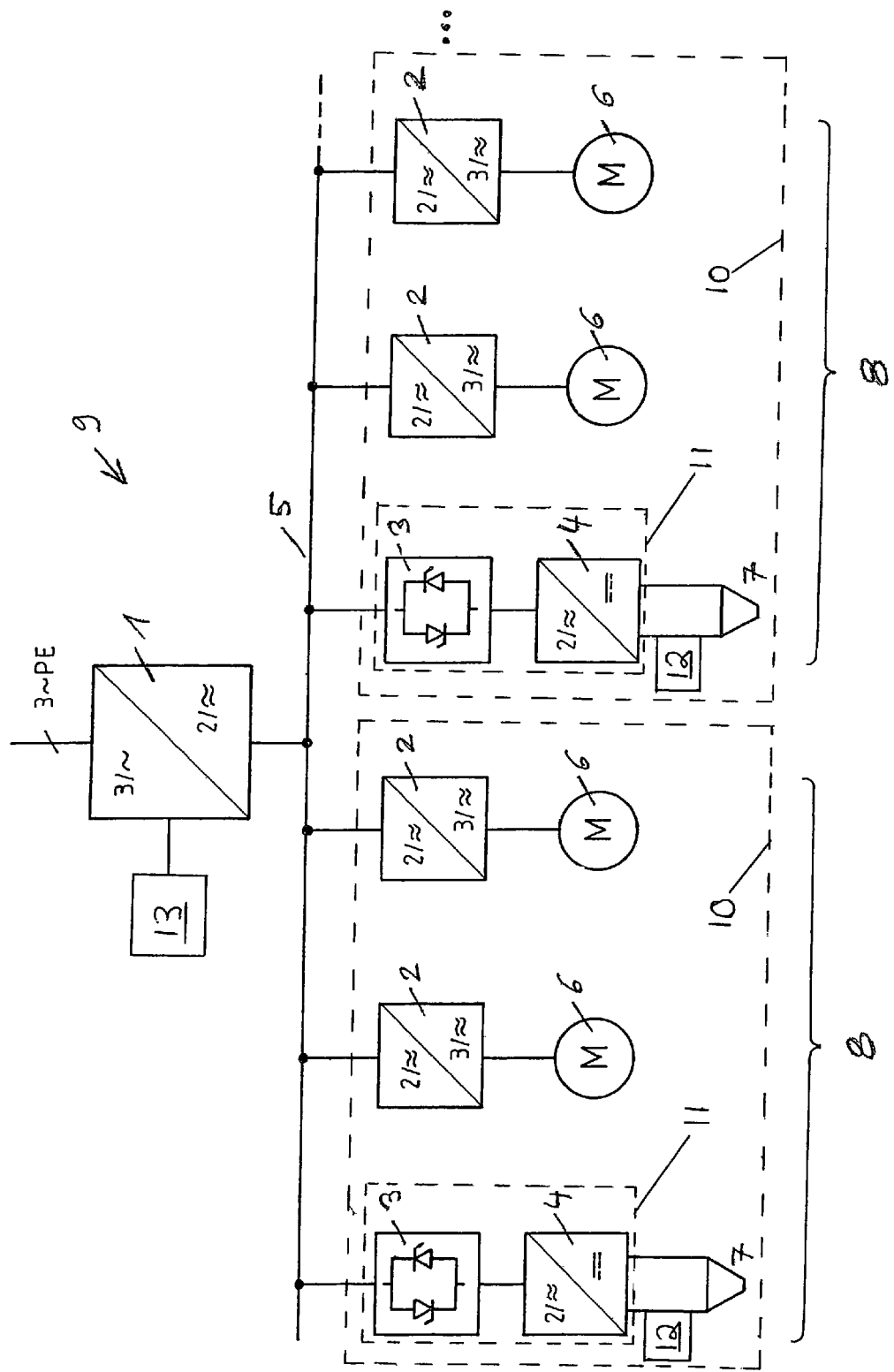
FIG. 3 is a schematic view of an example embodiment of the present invention.

The embodiment of the resistance welding system with modular power supply 9 shown in FIG. 3 is similar to that of FIG. 1, except that the monitoring of the total power of the system does not occur in main converter 1 but in a total power limit control 13.

Figure 4:
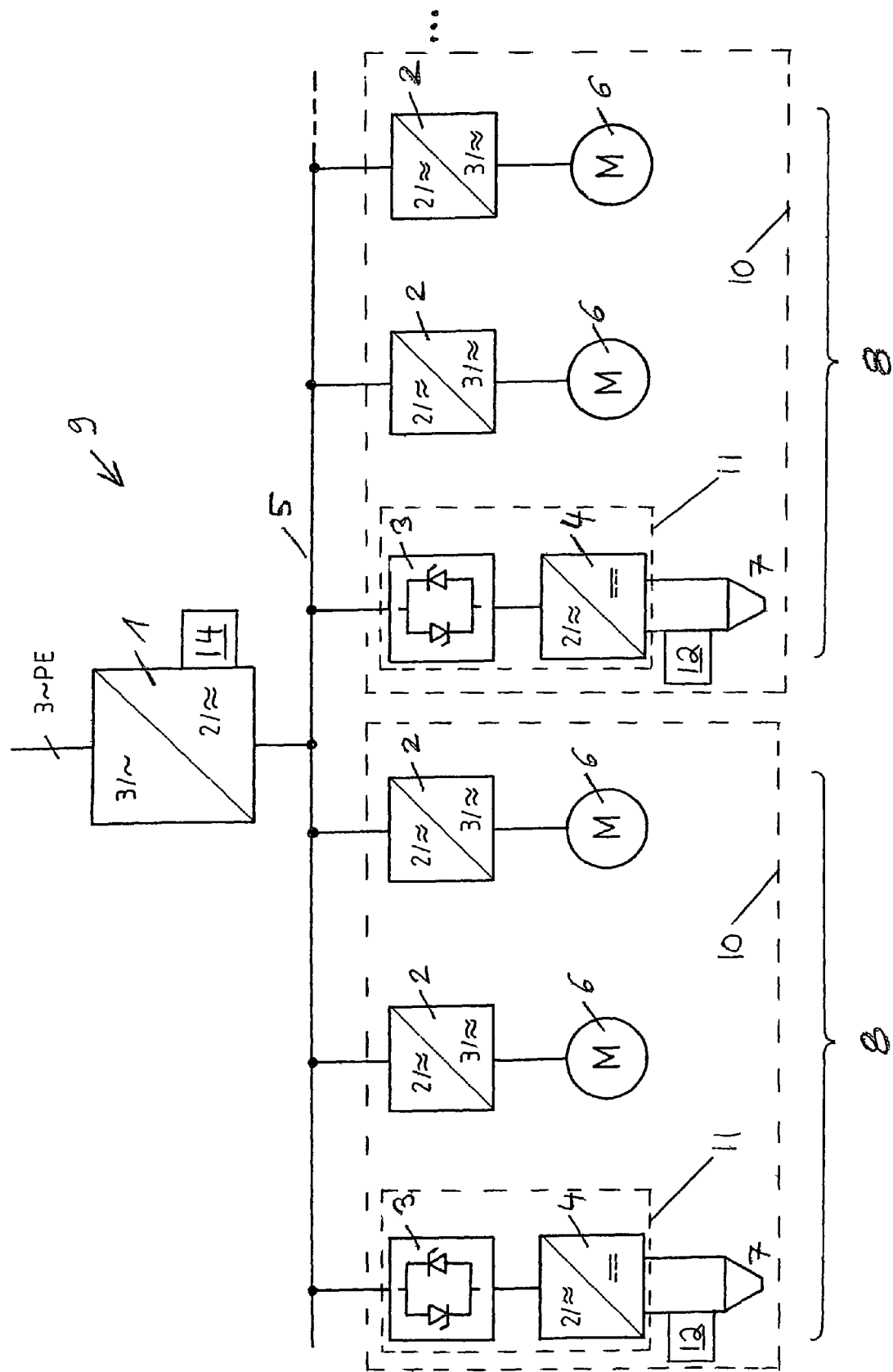
FIG. 4 is a schematic view of an example embodiment of the present invention.

The embodiment of the resistance welding system with modular power supply 9 shown in FIG. 4 is similar to that of FIG. 1, except that the main converter 1 includes a device adapted to influence harmonic waves 14.

What is claimed is:

1. A resistance welding device, comprising:
    a main converter;
    at least one auxiliary converter; and
    a power supply including the main converter and the at least one auxiliary converter, the main converter and the at least one auxiliary converter being connected with one another via an A.C. voltage intermediate circuit;
    wherein the at least one auxiliary converter includes a first auxiliary converter arranged as a drive converter for a first electrical drive and a second auxiliary converter arranged as a welding converter for a welding clamp,
    wherein the main converter and the first auxiliary converter arranged as a drive converter are adapted to convert an input voltage with respect to at least one of (a) phase or (b) frequency, the welding converter arranged as a load power control,
    wherein the load power control is arranged as a phase-angle control,
    wherein the at least one auxiliary converter includes third and fourth auxiliary converters arranged as drive converters for second and third electrical drives, and a welding clamp drive includes the third and fourth auxiliary converters and the second and third electrical drives, the third and fourth auxiliary converters arranged as drive converters using a common D.C. voltage intermediate circuit, and
    wherein the welding clamp drive includes only one tap on the A.C. voltage intermediate circuit for the third and fourth auxiliary converters arranged as drive converters.

2. The device according to claim 1, wherein at least one of (a) a welding clamp housing and (b) a welding transformer housing includes at least one of (a) the drive converters, (b) the welding converter and (c) a welding control.

3. The device according to claim 1, wherein at least one of (a) the main converter and (b) a welding control is adapted to monitor a total power to be generated by the main converter for loads connected to at least one of (a) the drive converters and (b) the welding converter.

4. The device according to claim 3, wherein a total power limit control is adapted to perform the monitoring, wherein loads are managed for operation in accordance with management instructions, such that a requested power of all loads connected to the main converter does not exceed a permitted peak load.

5. The device according to claim 1, wherein the main converter includes a device adapted to influence harmonic waves.

6. The device according to claim 1, further comprising:
    a device adapted to at least one of (a) pneumatically operate and (b) hydraulically operate the welding clamp.

7. The device according to claim 1, wherein at least one of (a) a welding clamp housing and (b) a welding transformer housing includes at least one of (a) the drive converters, (b) the welding converter and (c) a welding control, and wherein at least one of (a) the main converter and (b) a welding control is adapted to monitor a total power to be generated by the main converter for loads connected to at least one of (a) the drive converter and (b) the welding converter.

8. The device according to claim 7, wherein a total power limit control is adapted to perform the monitoring, wherein loads are managed for operation in accordance with management instructions, such that a requested power of all loads connected to the main converter does not exceed a permitted peak load.

9. The device according to claim 8, further comprising:
    a device adapted to at least one of (a) pneumatically operate and (b) hydraulically operate the welding clamp;
    wherein the main converter includes a device adapted to influence harmonic waves.

10. The device according to claim 1, wherein at least one of (a) the main converter and (b) a welding control is adapted to monitor a total power to be generated by the main converter for loads connected to at least one of (a) the drive converters and (b) the welding converter.

11. The device according to claim 10, wherein a total power limit control is adapted to perform the monitoring, wherein loads are managed for operation in accordance with management instructions, such that a requested power of all loads connected to the main converter does not exceed a permitted peak load.

12. The device according to claim 11, further comprising:
    a device adapted to at least one of (a) pneumatically operate and (b) hydraulically operate the welding clamp;
    wherein the main converter includes a device adapted to influence harmonic waves.

13. A robot, comprising:
    a power supply, which includes a main converter and at least one auxiliary converter; and
    a resistance welding device including the power supply;
    wherein the main converter and the at least one auxiliary converter connected with one another via an A.C. voltage intermediate circuit,
    wherein the at least one auxiliary converter includes a first auxiliary converter arranged as a drive converter for a first electrical drive and a second auxiliary converter arranged as a welding converter for a welding clamp,
    wherein the main converter and the first auxiliary converter arranged as a drive converter are adapted to convert an input voltage with respect to at least one of (a) phase or (b) frequency, the welding converter arranged as a load power control,
    wherein the load power control is arranged as a phase-angle control,
    wherein the at least one auxiliary converter includes third and fourth auxiliary converters arranged as drive converters for second and third electrical drives, and a welding clamp drive includes the third and fourth auxiliary converters and the second and third electrical drives, the third and fourth auxiliary converters arranged as drive converters using a common D.C. voltage intermediate circuit, and
    wherein the welding clamp drive includes only one tap on the A.C. voltage intermediate circuit for the third and fourth auxiliary converters arranged as drive converters.

14. The robot according to claim 13, wherein at least one of (a) a welding clamp housing and (b) a welding transformer housing includes at least one of (a) the drive converters, (b) the welding converter and (c) a welding control.

15. The robot according to claim 13, wherein at least one of (a) the main converter and (b) a welding control is adapted to monitor a total power to be generated by the main converter for loads connected to at least one of (a) the drive converters and (b) the welding converter.

16. The robot according to claim 15, wherein a total power limit control is adapted to perform the monitoring, wherein loads are managed for operation in accordance with management instructions, such that a requested power of all loads connected to the main converter does not exceed a permitted peak load.

17. The robot according to claim 13, wherein the main converter includes a device adapted to influence harmonic waves.

18. The robot according to claim 13, further comprising:
a device adapted to at least one of (a) pneumatically operate and (b) hydraulically operate the welding clamp.

19. The robot according to claim 13, wherein at least one of (a) a welding clamp housing and (b) a welding transformer housing includes at least one of (a) the drive converters, (b) the welding converter and (c) a welding control, and wherein at least one of (a) the main converter and (b) a welding control is adapted to monitor a total power to be generated by the main converter for loads connected to at least one of (a) the drive converter and (b) the welding converter.

20. The robot according to claim 19, wherein a total power limit control is adapted to perform the monitoring, wherein loads are managed for operation in accordance with management instructions, such that a requested power of all loads connected to the main converter does not exceed a permitted peak load.

21. The robot according to claim 20, further comprising:
a device adapted to at least one of (a) pneumatically operate and (b) hydraulically operate the welding clamp;
wherein the main converter includes a device adapted to influence harmonic waves.

22. The robot according to claim 13, wherein a total power limit control is adapted to perform the monitoring, wherein loads are managed for operation in accordance with management instructions, such that a requested power of all loads connected to the main converter does not exceed a permitted peak load.

23. The robot according to claim 22, further comprising:
a device adapted to at least one of (a) pneumatically operate and (b) hydraulically operate the welding clamp;
wherein the main converter includes a device adapted to influence harmonic waves.

* * * * *